United States Patent [19]

Heisler

[11] 3,907,481
[45] Sept. 23, 1975

[54] ASSEMBLY FOR FORMING THE BELL END OF A BELL AND SPIGOT JOINT
[75] Inventor: Robert Walter Heisler, Somerville, N.J.
[73] Assignee: Johns-Manville Corporation, Denver, Colo.
[22] Filed: Sept. 24, 1973
[21] Appl. No.: 400,488

Related U.S. Application Data
[62] Division of Ser. No. 240,080, March 31, 1972, Pat. No. 3,807,027.

[52] U.S. Cl. ........ 425/393; 425/DIG. 218; 425/388
[51] Int. Cl.² .................... B29D 23/00; B29C 17/00
[58] Field of Search........... 425/DIG. 218, 393, 392, 425/403, 388, 469, DIG. 47

[56] References Cited
UNITED STATES PATENTS

| | | | |
|---|---|---|---|
| 2,329,000 | 9/1943 | Rembert | 29/235 |
| 3,264,383 | 8/1966 | Niessner et al. | 264/95 |
| 3,520,047 | 7/1970 | Muhlner et al. | 264/92 X |
| 3,732,054 | 5/1973 | Lyng | 425/393 |

Primary Examiner—Francis S. Husar
Assistant Examiner—R. J. Charvat
Attorney, Agent, or Firm—Robert M. Krone; Stephen C. Shear

[57] ABSTRACT

A method of forming the bell end of a bell and spigot joint connecting two pipes together is disclosed herein and utilizes an elongated mandrel having a circumferential recess and a circumferential ramped surface extending from the recess. A sealing gasket is positioned around the mandrel and within the recess, whereupon a heat deformable pipe, heated to its deformable state, is contoured around the gasket supporting mandrel. In this manner, an inner circumferential groove is formed in the pipe and about the gasket so that the latter is disposed within the groove. After the pipe has cooled, the mandrel is withdrawn therefrom, leaving the gasket disposed within the formed groove. During this withdrawal process at least a portion of the gasket is initially outwardly deformed so that it may be easily removed from the recess formed in the mandrel.

16 Claims, 5 Drawing Figures

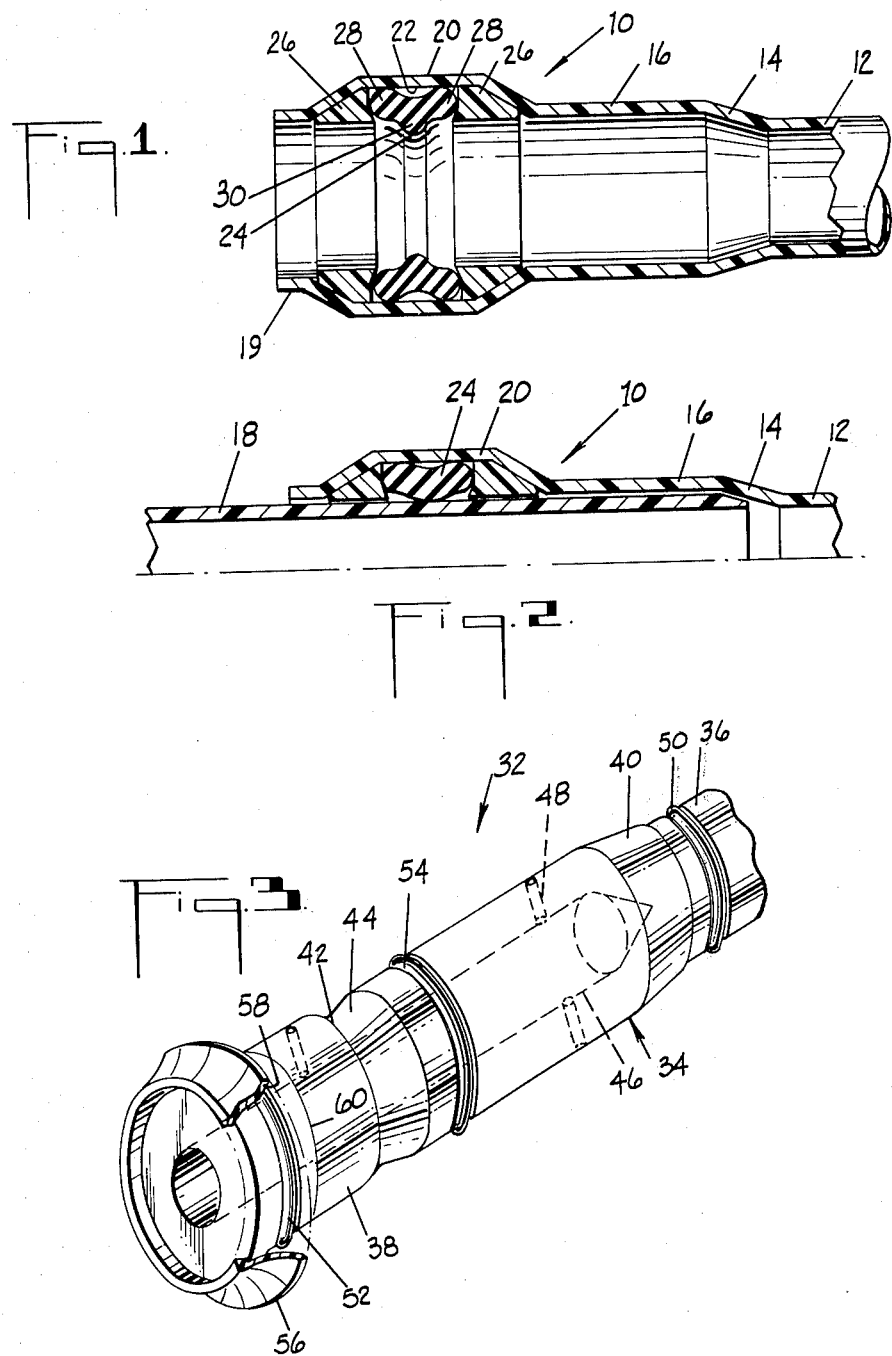

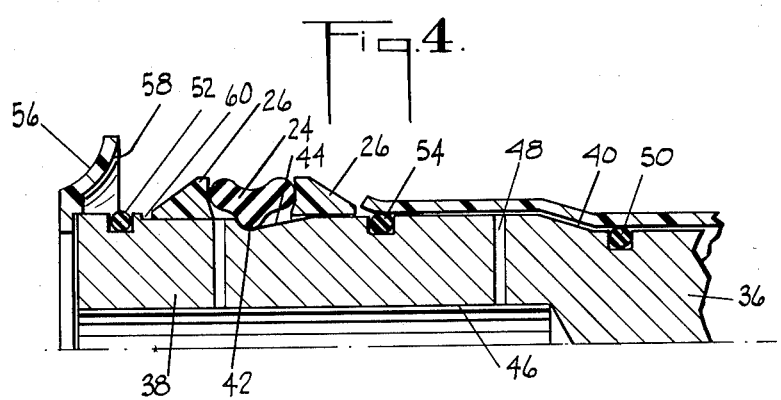
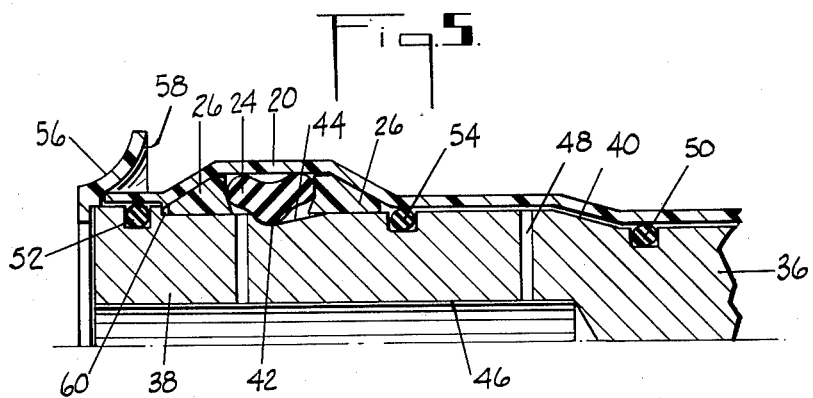

ASSEMBLY FOR FORMING THE BELL END OF A BELL AND SPIGOT JOINT

This is a division of application Ser. No. 240,080, filed Mar. 31, 1972, and now U.S. Pat. No. 3,807,027.

BACKGROUND OF THE INVENTION

SUMMARY OF THE INVENTION

The present invention relates generally to the formation of pipe joints and more particularly to a method of and assembly for providing the bell end of a bell and spigot joint.

DISCUSSION OF THE PRIOR ART

Heretofore, there have been many suggested methods of seal connecting together two pipes. One such method utilizes a bell and spigot joint which includes a female counterpart member, commonly referred to as the bell end, having an enlarged sleeve defining an inner circumferential groove. An annular sealing gasket and two support or retainer rings positioned on opposite sides of the gasket are provided within the groove and co-axial with the pipe. In this manner, the male counter-part member, commonly referred to as the spigot, can be inserted into the bell end such that the gasket provides a seal therebetween.

One method of forming the aforedescribed bell end is disclosed in U.S. Pat. No. 3,520,047 issued to Muhlner et al. In one embodiment illustrated in this patent, the gasket (packing ring) and two support or retainer rings are positioned around the external surface of an elongated core. A thermoplastic pipe, which has been heated to its deformable state, is positioned concentrically around the core, gasket and support rings and allowed to cool. In this manner, an annular furrow defining an inner circumferential groove is formed in the pipe around the gasket and support rings. Thereafter, the core is separated from the pipe, the gasket and rings remaining within the formed furrow.

It has been found that the foregoing method requires various tolerance limitations which are, in many cases, difficult to maintain. For example, the aforedescribed annular groove is formed while the gasket is positioned around the outermost circumference of the core, that is, the circumference representing the outer diameter of the spigot. Hence, if the outer diameter of the spigot is even slightly less than the outer diameter of the core, which can be the case due to tolerance limitations, the sealing capability of the gasket is lessened.

In a second embodiment illustrated in Muhlner et al, the foregoing formation procedure is approximately followed with one specific exception. The gasket is replaced with a preliminary filling ring during formation of the annular furrow, apparently due to the aforedescribed tolerance problems. After formation, the filling ring is removed and a permanent gasket is inserted in the formed groove. It has been found, however, that installation of the gasket after formation of the groove is quite difficult and time-consuming. In addition, the groove is not always of proper design to receive the gasket and/or the gasket is not always located properly within the groove or securely held therein.

In addition to the foregoing, there are various other deficiencies of the prior art which are eliminated by the present invention such as, for example, the inability, heretofore, to properly contour the pipe, once heated, about a cooperating core to form the bell end. Reliable contouring is, of course, important since the outer diameter of the core represents the outer diameter of the spigot of the bell and spigot joint.

SUMMARY OF THE INVENTION

In accordance with the foregoing deficiencies of the prior art as well as other deficiencies thereof, an object of the present invention is to provide an improved method of forming an inner circumferential groove in a heat deformable pipe.

Another object of the present invention is to provide an improved method of contouring a heat deformable pipe around an elongated core having a raised surface.

Still another object of the present invention is to provide an improved method of forming the bell end of a bell and spigot joint around a mandrel and in one end of a heat deformable pipe.

Yet another object of the present invention is to provide an improved method of separating the bell end, once formed, from the mandrel.

A further object of the present invention is to provide a new and improved mandrel assembly utilized in forming an inner circumferential groove in a heat deformable conduit.

Still a further object of the present invention is to provide new and improved mandrel assembly utilized in forming the bell end of a pipe connecting bell and spigot joint.

These and other objects and features of the present invention will become apparent from the following descriptions.

DESCRIPTION OF THE DRAWINGS

In the drawings:

FIG. 1 is a frontal cross-sectional view of the bell end of a bell and spigot joint formed in accordance with the present invention;

FIG. 2 is a frontal cross-sectional view of the bell end of FIG. 1 with the spigot inserted therein;

FIG. 3 is a partially broken away perspective view of a mandrel assembly constructed in accordance with the present invention and preferably utilized in the formation of the bell end of FIG. 1; and FIGS. 4 and 5 are frontal cross-sectional views of the mandrel assembly of FIG. 3 illustrating the formation of the bell end.

DETAILED DESCRIPTION

The present invention is directed to a reliable and uncomplicated method of forming the bell end of a bell and spigot joint in one end section of a heat deformable pipe so as to provide an enhanced seal between the bell end and the spigot of the joint. In this regard, a new and improved mandrel assembly is utilized in the formation process. The assembly, in accordance with the present invention, includes a core having a circumferential recess adapted to receive a sealing gasket and a circumferential ramped surface tapering outwardly and away from the recess.

In accordance with a preferred method of forming the aforestated bell end, a gasket is initially positioned around the core and within the circumferential recess so that a portion of the gasket extends substantially inwardly from the outer circumferential surface of the core. As will be seen hereinafter, a pair of support or retainer rings may also be placed around the core and on opposite sides of the sealing gasket. Thereafter, one end section of a heat deformable pipe, heated to the range of thermoelastic deformability, is positioned around the core including the sealing gasket and support rings to form the bell end which includes an enlarged sleeve having an inner circumferential groove with the aforestated gasket and support rings disposed therein. After the bell end has sufficiently cooled, the core is withdrawn such that the gasket and support rings remain disposed within the inner circumferential groove. During initial withdrawal of the core and in accordance with the present invention, the sealing gasket is caused to move up the aforedescribed ramp surface so as to deform radially outwardly. In this manner, the gasket is easily removed from within the circumferential recess provided in the core.

It should be readily apparent from the foregoing that the inner diameter of the enlarged sleeve comprising part of the bell end is equal to the outer diameter of the aforedescribed core and therefore approximately equal to the outer diameter of the spigot, of course, taking into account tolerance limitations in the formation of the latter. In addition, it should be apparent that the sealing gasket extends a substantial distance radially inwardly from the inner surface of the enlarged sleeve, due, for the most part, to the utilization of the aforedescribed recess in the core. Hence, if the spigot does not fit tightly within the sleeve, due, for example, to the aforestated tolerance limitations, the gasket nevertheless provides a reliable seal between the two. Thus, it is not necessary to rely on unreasonable and sometimes impossible tolerance limitations in the formation of the bell end of a bell and spigot joint.

Turning now to the drawings, where like components are designated by like reference numerals throughout the various figures, the bell end 10 of a bell and spigot joint, formed in accordance with the present invention, is shown in FIG. 1. Bell end 10 is formed from one end section of a pipe constructed of a heat deformable material such as, for example, polyvinylchloride and includes an enlarged bell-shaped sleeve 16 which tapers inwardly at 14 and merges with the undeformed section 12 of the pipe. While the heat deformable pipe and therefore the enlarged sleeve will be described and illustrated as having a circular cross-section, it is to be understood that other cross-sectional configurations are contemplated.

As illustrated in FIG. 1, the inner diameter of sleeve 16 is substantially equal to the outer diameter of undeformed section 12. Hence, the sleeve is adapted to receive the spigot 18 (FIG. 2) of the bell and spigot joint in a co-axial fashion, the spigot having an outside diameter equal to that of undeformed pipe section 12. In this regard, the free end of sleeve 16 is preferably further enlarged outwardly at 19 in order to facilitate insertion of the spigot. In addition, the enlarged sleeve includes a radially outwardly extending annular furrow 20 which defines an inner circumferential channel or groove 22. An annular sealing gasket 24 constructed of, for example, hard rubber is disposed within the groove and extends inwardly a substantial distance beyond the inner surface of the sleeve. In this manner, the gasket provides a reliable seal between the spigot and bell end of the joint. If necessary, the gasket may be held in this position by a pair of support rings 26 also positioned within groove 22 and on opposite sides of the gasket.

As illustrated best in FIG. 1, sealing gasket 24 displays a profile defined by rounded corners 28 positioned within the annular groove 22 and rounded corner 30 extending into enlarged sleeve 16 a substantial distance beyond the internal surface thereof. The rounded corners are joined by concave surface lines. The support rings 26, which are preferably constructed of, for example, polyvinylchloride, display a substantially triangular profile and are positioned firmly against the side walls of annular groove 22 so that their radially inwardly facing surfaces are substantially flush with the inner surface of enlarged sleeve 16. In addition, the confronting surfaces of support rings 26 are slightly indented for firmly receiving and interlocking with the rounded corners 28 of sealing gasket 24 to aid in holding the latter within annular groove 22.

Turning to FIG. 2, bell end 10 is shown engaged around the spigot 18. As illustrated, the spigot is positioned concentrically within the enlarged sleeve 16 of the bell end and adjacent the inside wall thereof. In this manner, the radially inwardly extending circumferential corner 30 of gasket 24 is compressed or deformed outwardly while the remainder of the gasket is held fixed within channel 22. Hence, a reliable seal is provided between members 10 and 18.

It is to be understood that the present invention is not limited to the sealing gasket described in FIGS. 1 and 2, but rather contemplates any suitable gasket which is capable of deforming the manner shown in FIG. 2 for providing a reliable seal. In addition, the particular configuration of support rings 26 will, in large part, depend upon the shape of the gasket. In fact, in some cases the support rings will not be necessary, as will become apparent hereinafter.

Turning now to FIG. 3, attention is directed to a mandrel assembly 32 which is constructed in accordance with the present invention and which is preferably utilized in the formation of bell end 10, as will be seen hereinafter. The mandrel assembly includes a cylindrical core having a rearward section 36, the diameter of which is slightly larger than the diameter of undeformed pipe section 12, and an enlarged forward section 38, the diameter of which is substantially equal to the outer diameter of spigot 18. The two sections, which are co-axial and spaced apart, are joined together by an intermediate radially tapering section 40.

As illustrated, core section 38 includes a circumferential recess 42 adapted to receive a sealing gasket such as, for example, gasket 24. In this manner, a portion of the sealing gasket extends radially outwardly from the outermost surface of core section 38 and a portion extends radially inwardly therefrom. In addition, section 38 includes annular ramped surface 44 tapering radially outwardly from the innermost circumferential surface defining recess 42 and in the direction of rearward core section 36. As will be described in more detail hereinafter, the ramped surface, in accordance with the present invention, facilitates removal of gasket 24 from recess 42 during withdrawal of core 34 from bell end 10 once the latter is formed.

In order to accurately contour member 10 around core 34, it may be desirable to apply radially inward suction between the two. Hence, in a preferred embodiment, core 34 includes a central bore 46 extending from the free end of enlarged core section 38 and terminating slightly to the right-hand side of tapering surface 40, as viewed in FIG. 3. From bore 46, a plurality of suction providing air passages or apertures 48 extend radially outwardly to the surface of the core. While only a few of these air passages are shown, it is to be understood that a large number thereof may be provided throughout the length of core sections 38 and 40. In this manner, a suction device (not shown) may be applied to the open end of central bore 46 for, in effect, providing a vacuum therein. In this regard, a pair of O-rings 50 and 52 are disposed within annular recesses in respective core sections 36 and 38 for providing a seal between the core and member 10, the O-ring 50 being positioned slightly to the right of tapered surface 40 as viewed in FIG. 3, and the O-ring 52 being positioned near the free end of core section 38.

In addition to the foregoing, mandrel assembly 32 includes a third O-ring 54 disposed within a recess circumscribing core section 38 slightly to the right of ramped surface 44, as viewed in FIG. 3. Further, an end ring 56 is positioned concentrically around the free end of core section 38 and includes a surface 58 which tapers radially inwardly and towards the free end of core section 38. The end ring may be held in the position in any suitable manner. As will be seen hereinafter, both O-ring 54 and end ring 56 aid in the formation of member 10 around core 34.

With mandrel assembly 32 constructed in the aforedescribed manner, attention is now directed to a method of forming bell end 10 in accordance with a preferred embodiment of the present invention. As illustrated in FIG. 4, a sealing gasket such as gasket 24 is positioned around core section 38 and within recess 42. The support rings 26 may also be positioned around core section 38 such that their confronting surfaces engage respective rounded corners 28 of the gasket 24. In this regard, it should be noted that the forward most end of core section 38 may be slightly radially enlarged to provide an annular shoulder 60 adapted to engage with the forward most supporting ring 26 for preventing the latter from moving longitudinally forward during the formation of member 10. Enlargement of core section 38 to produce shoulder 60 provides further enlargement of the free end 19 of sleeve 16 of member 10 which, in turn, facilitates insertion of spigot 18. If desired or necessary, the core sections may be suitably lubricated and/or heated to reduce friction.

After the end section of an appropriately dimensioned heat deformable pipe has been heated to the range of thermoelastic deformability, which can be provided in any suitable way, the free end of the heated pipe section is positioned concentrically around the free end of core section 36. The end section is then caused to move forward up tapered surface 40 and over the O-ring 54 which aids in moving the end section up the first support ring 26, as illustrated in FIG. 4. This, of course, causes the end section to deform outwardly and over gasket 24. As forward movement is continued, the free end of the heated end section moves past the gasket and is caused to deform inwardly by the surface 58 of end ring 56, as viewed in FIG. 5. At this time, internal suction and/or externally applied and radially inwardly directed pressure (not illustrated) may be conventionally applied to the core 34.

It should be readily apparent from FIG. 5 that bell end 10 is formed and includes the inner circumferential groove 22 with gasket 24 and support rings 26 disposed therein. Thereafter, the newly formed bell end is allowed to cool to a temperature below the range of thermoelastic deformability by, for example, exposure to ambient temperature or by application of a cooling fluid thereto. Once the bell end has sufficiently cooled, it is separated from the mandrel assembly with gasket 24 and support rings 26 remaining disposed within inner circumferential groove 22. During initial separation, and in accordance with the present invention, the gasket moves up ramped surface 44 deforming radially outwardly and thereby easily moves out of recess 42. During this deformation, the outer circumferential surface of gasket 24 is held in place by furrow 20. Hence, the possibility of dislocating the gasket during the withdrawal process is minimized.

The heated end section may be positioned around mandrel assembly 32 and separated therefrom after formation of bell end 10 by conventional means such as an apparatus illustrated and described in U.S. Pat. No. 3,520,047 issued to Muhlner et al. on July 14, 1970. In this regard, while the heated end section was described as moving onto and over the core 34, it should be readily apparent that the core could be moved into the heated end section or both the mandrel assembly and end section could be moved simultaneously.

It should be readily apparent from the foregoing, that bell end 10 is formed in an uncomplicated and reliable fashion. In addition, while the bell end has been described with a specifically designed gasket 24, the present method is capable of and contemplates using gaskets of various other cross-sectional profiles. Further, while bell end 10, as described, as formed from a cylindrical pipe and displays a circular cross-section, it is to be understood that female counterpart members having other cross-section configurations may be formed in accordance with the present invention. In this regard, the mandrel assembly could be modified in accordance with the cross-section configuration of the pipe to be used without departing from the teachings of the present invention.

It is to be understood that various modifications to the present invention may be made without departing from the spirit of the invention. It is also to be understood that the scope of the present invention is not to be interpreted as limited to the specific embodiment described herein, but only within accordance to the appended claims when read in light of the foregoing disclosure.

What I claim is:

1. An assembly for use in forming an inner-circumferential groove in a heat deformable pipe, said assembly comprising:
   a. an elongated cylindrical mandrel adapted for insertion concentrically within one end of a heat deformable pipe by relative movement between the mandrel and pipe;
   b. said mandrel including about its outer periphery a circumferential recess;
   c. a circumferential sealing gasket, a circumferential portion of which is located within said recess and a circumferential portion of which is located outside said recess;
   d. an annular ramped surface comprising one circumferential side of said recess and tapering radially outwardly and away from the other side of said recess; and
   e. means for guiding said one end of said pipe outwardly of said gasket as said end approaches said gasket during said relative movement.

2. An assembly according to claim 1 including an annular shoulder positioned around the periphery of said mandrel and located to one side of said recess opposite said ramped surface, said shoulder being adapted to engage with a support ring positionable on said mandrel whereby to prevent axial movement of said ring in a direction away from said recess.

3. An assembly according to claim 1 including an end ring positioned concentrically about said mandrel and located to one side of said recess opposite said ramped surface, said end ring including a pipe engaging surface tapering radially inwardly and away from said recess, said pipe engaging surface being adapted to engage with the mandrel receiving end of said pipe for directing said end radially inwardly.

4. An assembly according to claim 1 including a pipe directing ring having a circumferential surface portion positioned concentrically about said mandrel and located adjacent the radially outermost end of said ramped surface, said surface portion including an inclined surface adapted to direct the mandrel receiving end of said pipe radially outwardly.

5. An assembly for use in forming the bell end of a bell and spigot joint in one end section of a heat deformable pipe, said assembly comprising:
   a. an elongated cylindrical mandrel adapted for insertion concentrically within one end of a heat deformable pipe, said mandrel having a first longitudinal section and a second radially larger section joining said first section by a tapering intermediate section, said second larger section including about its periphery a circumferential recess adapted to receive a ring-shaped sealing gasket and an annular ramped surface tapering radially outwardly and away from said circumferential recess, said ramped surface being adapted to radially outwardly deform said sealing gasket;
   b. an annular shoulder positioned around the periphery of said second mandrel section and located to one side of said groove opposite said ramped surface, said shoulder being adapted to engage with a support ring positionable on said mandrel whereby to prevent axial movement of said ring in a direction away from said recess;
   c. an end ring positioned concentrically about the second section of said mandrel and located to one side of said shoulder opposite said recess, said end ring including a pipe engaging surface tapering radially inwardly;
   d. and a pipe directing ring positioned concentrically about said second section and located adjacent the radially outermost end of said ramped surface, said directing ring including an inclined surface adapted to direct the mandrel receiving end of said pipe radially outwardly.

6. An assembly according to claim 5 wherein at least the second section of said mandrel is hollow and includes a plurality of passages extending from the internal surface of said second section to the external surface thereof, and wherein said mandrel further includes first and second O-ring receiving grooves defined around its outer periphery, said first O-ring receiving groove being positioned around said first section and said second section.

7. An assembly for use in forming an inner circumferential groove in a heat deformable pipe, said assembly comprising:

a. an elongated mandrel having a predetermined cross-section and adapted for insertion within one end of a heat deformable pipe of a similarly shaped cross section by relative movement between said mandrel and pipe;
b. said mandrel including about its outer periphery a circumferential recess;
c. a circumferential sealing gasket, a circumferential portion of which is located within said recess and a circumferential portion of which is located outside said recess;
d. a circumferential ramped surface comprising one circumferential side of said recess and tapering outwardly and away from the other side of said circumferential recess; and
e. means for guiding said one end of said pipe outwardly of said gasket as said end approaches said gasket during said relative movement.

8. An assembly for use in forming an inner circumferential groove having retainable forming means disposed therein in a heat deformable pipe section, said assembly comprising:
   a. a core having a predetermined outer surface configuration including a circumferential recess about its periphery, said core being adapted for insertion concentrically within one end of a heat deformable pipe by relative movement between said core and pipe;
   b. a retainable forming means at least including a circumferential sealing gasket positioned around said core so that a circumferential portion of said gasket is disposed in said recess and a circumferential portion of said gasket is located outside of said recess and so that the combined outer surface configuration of said core and said retainable forming means is similar to the inner surface configuration desired to be formed in said pipe section;
   c. means for guiding said one end of said pipe outwardly of said gasket as said end approaches said gasket during said relative movement;
   d. means for outwardly deforming said gasket from said supported position during initial relative longitudinal movement of said positioned gasket and core whereby to aid in removing said gasket from said recess.

9. An assembly according to claim 8 wherein the inner cross-sectional configuration of said pipe section is circular.

10. An assembly according to claim 8 wherein said deforming means includes a circumferential ramped surface around the periphery of said core, said ramped surface comprising one circumferential side of said recess and tapering outwardly from the other circumferential side of said recess.

11. An assembly according to claim 10 wherein said retainable forming means includes at least one circumferential gasket support element.

12. An assembly for forming an inner circumferential groove having a circumferential retainable forming means disposed therein in a heat deformable pipe section, said assembly comprising:
   a. a core section having a predetermined outer surface configuration and being adapted for insertion concentrically within one end of a heat deformable pipe;
   b. circumferential retainable forming means at least including a circumferential sealing gasket;

c. means for supporting said circumferential retainable forming means including said gasket in alignment with said core section such that in the supported position of the gasket the innermost periphery of said gasket is disposed inwardly of the outer surface configuration of said core section at all points along the inner periphery of the gasket and circumferential portion of said gasket extends outwardly of said outer surface configuration of said core section and such that the combined outer surface configuration of said core section and said retainable forming means is similar to the inner surface configuration desired to be formed in said pipe section;

d. means for guiding said one end of said pipe outwardly of said gasket as said end approaches said gasket during relative movement; and d. means for outwardly deforming said gasket from said supported position as a result of initial relative longitudinal movement of said gasket and core section.

13. An assembly according to claim 12 wherein the inner cross-sectional configuration of said pipe section is circular.

14. An assembly according to claim 12 wherein said supporting means comprises a circumferential recess about the periphery of said core section and wherein said gasket is positioned around said core section so that a circumferential portion of said forming means is disposed in said recess.

15. An assembly according to claim 14 wherein said deforming means comprises a circumferential ramped surface around the periphery of said core, said ramped surface comprising one circumferential side of said recess and tapering outwardly from the other circumferential side of said recess.

16. An assembly according to claim 15 wherein said forming means includes at least one circumferential gasket support element.

* * * * *

UNITED STATES PATENT AND TRADEMARK OFFICE
CERTIFICATE OF CORRECTION

PATENT NO. : 3,907,481
DATED : September 23, 1975
INVENTOR(S) : Robert Walter Heisler It is certified that error appears in the above-identified patent and that said Letters Patent are hereby corrected as shown below:

Column 4, line 27, "in" has been left out, should follow after --capable of deforming in the --

Column 8, line 4, (Claim 7a) "crosssection" should read --cross-section--

Column 9, line 8, (Claim 12c) "a" has been left out, should follow after --gasket and a circumferential--

Column 9, line 17, (Claim 12d) "said" has been left out, should follow after --gasket during said relative--

Column 9, line 18, (Claim 12e) "d" should read --e--

*Signed and Sealed this*

[SEAL]

*twenty-third* Day of *December 1975*

Attest:

RUTH C. MASON
*Attesting Officer*

C. MARSHALL DANN
*Commissioner of Patents and Trademarks*